Dec. 1, 1959   F. H. VAN NEST   2,914,917
CONTROL OF HEAT SUPPLY TO HEAT RECOVERY
BOILER OF REGENERATIVE CYCLE GAS
TURBINE POWERPLANT
Filed Nov. 9, 1956   2 Sheets-Sheet 1
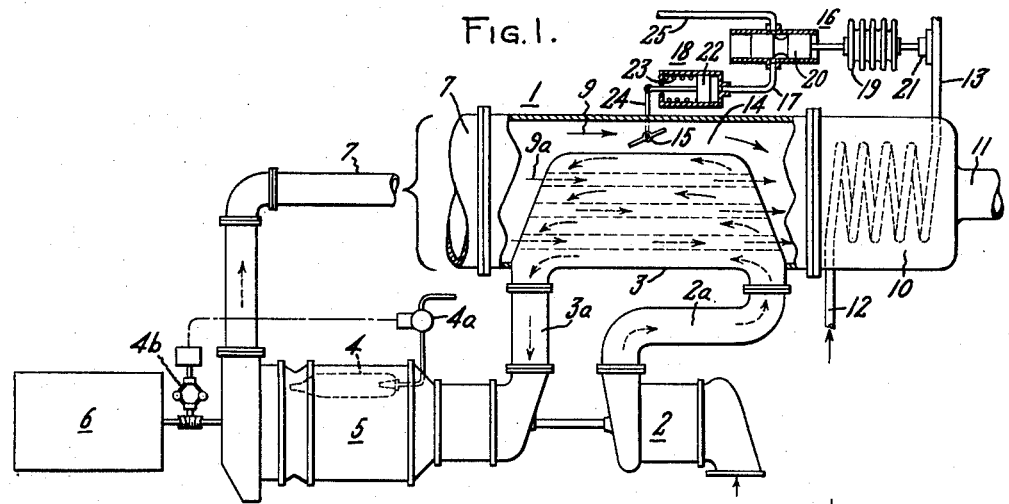
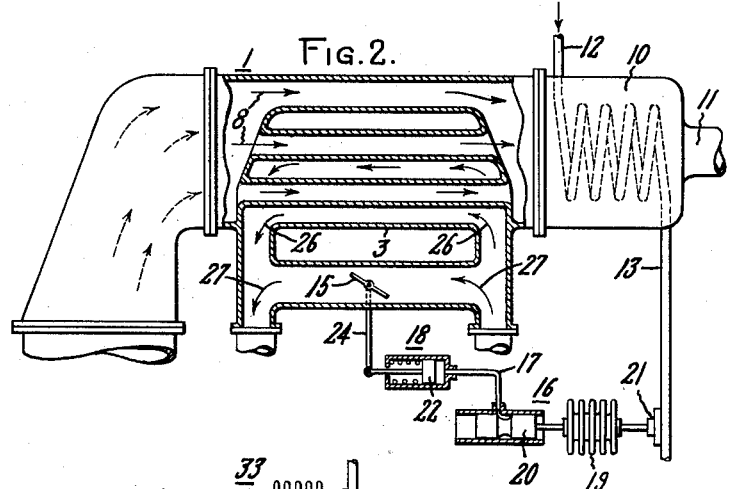
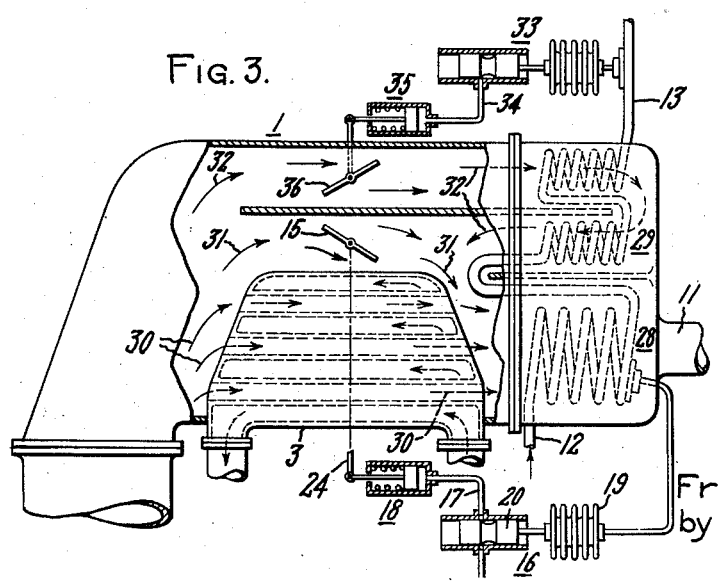
Inventor:
Francis H. Van Nest
by
His Attorney

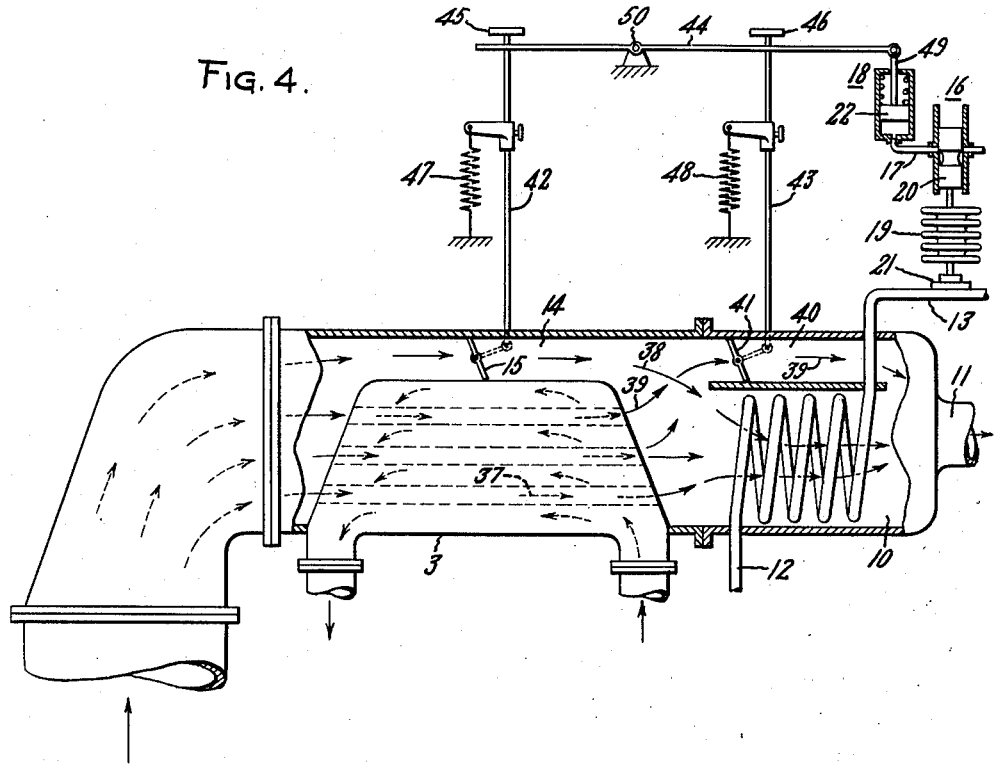

United States Patent Office 2,914,917
Patented Dec. 1, 1959

2,914,917

CONTROL OF HEAT SUPPLY TO HEAT RECOVERY BOILER OF REGENERATIVE CYCLE GAS TURBINE POWERPLANT

Francis H. Van Nest, Schenectady, N.Y., assignor to General Electric Company, a corporation of New York Application November 9, 1956, Serial No. 621,270

13 Claims. (Cl. 60—39.07)

My invention relates to gas turbine powerplants and more particularly to gas turbine powerplants having heat recovery boilers with means for controlling the heat supply to the heat recovery boilers.

It is an object of my invention to provide a gas turbine cycle having an improved system for dividing the heat supply between the gas turbine and the heat recovery boiler.

A further object is to provide an improved system for varying the heat input into the heat recovery boiler without the actual necessity of burning fuel in the heat recovery boiler.

A further object is to provide an improved system for forcing the gas turbine itself to burn more or less fuel as the heat requirements of the heat recovery boiler vary.

Further objects and advantages of my invention will become apparent as the following description proceeds and the features of novelty which characterize my invention will be pointed out with particularity in the claims annexed to and forming a part of the specification.

Briefly stated, in accordance with one aspect of my invention a gas turbine powerplant having a heat recovery boiler is arranged with a by-pass conduit and a valve control means for regulating the quantity of heat transfer between the hot exhaust gases and cold gases so as to regulate the amount of heat available to the heat recovery boiler. The gas turbine exhaust gases can be first passed through a regenerator or inlet air preheater and then through a heat recovery boiler with provision being made to by-pass a variable portion of the exhaust gases around the regerenator in response to the heat requirements of the heat recovery boiler.

The nature of the invention will best be understood when described in connection with the accompanying drawings, in which:

Fig. 1 illustrates one embodiment of my invention wherein the gas turbine exhaust gases are in part by-passed around the regenerator.

Fig. 2 illustrates a second embodiment of my invention wherein the gas turbine intake air is in part by-passed around the regenerator.

Fig. 3 illustrates an embodiment similar to that of Fig. 1, but having a superheater added to the heat recovery boiler.

Fig. 4 illustrates an embodiment similar to that of Fig. 1, but arranged so that both the regenerator and boiler can be by-passed.

Referring now to Fig. 1 there is illustrated diagrammatically a regenerative cycle gas turbine powerplant embodying the invention. The heat recovery apparatus is shown generally at 1. The air for the cycle enters the air compressor 2, which may be driven by the gas turbine 5, then passes into a regenerator or air preheater 3, is further heated by combustion of fuel in the chamber 4 and then passes into the gas turbine 5. The turbine may also drive a generator or equivalent load 6. The exhaust gases from the turbine enter the heat recovery apparatus 1 at 7 and travel in the path indicated by the arrows 9, 9a. Part of the exhaust gases travel through the regenerator or air preheater 3 wherein there is some heat transfer between the hot exhaust gases and the compressed air. The exhaust gases after being partially cooled by the gas turbine air pass from the regenerator into the heat recovery boiler. Another portion of the exhaust gases by-pass the regenerator or air preheater as indicated by the arrows 9 and pass directly into the heat recovery boiler 10. The exhaust gases after leaving the heat recovery boiler 10 pass out of the heat recovery apparatus through the stack 11. The boiler feed water enters the heat recovery boiler 10 at the feed water inlet 12, is vaporized into steam in the heat recovery boiler 10 and is withdrawn from the steam outlet 13 to any suitable consumer, not shown.

It will, of course, be understood that many conventional elements of gas turbine powerplants have been omitted, for the purpose of clarity. For instance, the air compressor 2 may be provided with suitable intercoolers to reduce the work of compression. Also, the fuel rate control mechanism is merely represented diagrammatically by the valve 4a, controlled by the speed governor 4b.

As the steam demand may be variable when the steam is used for processing in a chemical plant or paper mill, for instance, it is necessary to regulate the quantity of heat available to the heat recovery boiler. I provide means whereby a variable portion of the exhaust gases are by-passed around the regenerator 3 through the by-pass 14. The portion of the exhaust gases so by-passed is controlled by a by-pass control valve 15.

As the demand for steam changes, the steam pressure in steam outlet conduit 13 varies. A pressure responsive device shown generally at 16 is arranged to be responsive to the steam pressure and reacts to send an impulse through the line 17 to a valve control mechanism shown generally at 18. The valve control mechanism 18 regulates the position of the by-pass control valve 15 and thereby regulates the proportion of exhaust gases which are by-passed around the regenerator 3.

The pressure responsive device 16 and valve control mechanism 18 may consist, for example, of a pressure responsive bellows 19 which actuates a pilot valve 20. A pressure sensing device 21 actuates the pressure responsive bellows 19 which, in turn, regulates the position of the pilot valve 20. High pressure control oil from a suitable source of hydraulic liquid (not shown) is supplied through conduit 25 and is controlled by the pilot valve 20. The high pressure control oil operates through conduit 17 to control piston 22. A spring 23 biases the piston 22 against the force of the high pressure control oil.

The operation of this by-pass control system is as follows:

As the steam pressure in the steam outlet 13 varies in response to the steam demand, the pressure sensing device 21 expands or contracts the pressure responsive bellows 19 which, in turn, regulates the pilot valve 20. The movement of the pilot valve 20 acts to increase or decrease the pressure exerted by the high pressure control oil against the piston 22. Whenever the force of the high pressure control oil overcomes the biasing of the spring 23, the pressure operates to move the piston 22 to the left and rotates the by-pass control valve 15 in a counter-clockwise direction through the lever mechanism 24. The biasing spring 23 will rotate the by-pass control valve in a clockwise direction through the lever mechanism 24 whenever the pressure of the high pressure control oil against the piston 22 becomes less than the biasing force of the spring 23.

This system operates so as to require the gas turbine itself to burn more fuel as the heat requirements of the heat recovery boiler increase, thereby eliminating the need for the burning of additional fuel in the heat recovery boiler 10. The by-passing of a larger portion of the hot exhaust gases through the by-pass 14 and around the regenerator 3 lowers the temperature of the turbine intake air entering the combustion chamber 4. When the intake air temperature to the turbine decreases, the speed of the turbine decreases and the governor or regulator 4a, which may be, for example, similar to that described in a patent application, Serial No. 615,952, filed October 15, 1956 in the names of R. J. Brown and F. H. Van Nest, and assigned to the same assignee as the present application, supplies more fuel to the combustion chamber and thereby causes the gas turbine itself to burn all the fuel required by the system. This eliminates the need for fuel nozzles and fuel supply regulating means in the heat recovery boiler.

Referring now to Fig. 2, there is shown an embodiment of my invention wherein the gas turbine inlet air is in part by-passed around the regenerator or air preheater so as to control the amount of heat available to the heat recovery boiler. Corresponding parts of Figs. 1 and 2 are identified by the same numbers.

The heat available to the heat recovery boiler is varied according to the varying demand of steam similar to the manner shown in the embodiment of Fig. 1. All of the gas turbine exhaust gases pass through the regenerator 3 following the path indicated by the arrows 8. The compressed air enters the regenerator, following the path indicated by the arrows 26. A variable portion of the compressed air is by-passed around the regenerator as indicated by the arrows 27. The hot turbine exhaust gases are cooled by the relatively cool compressed air in the regenerator 3. The gas turbine exhaust gases are thus cooled a varying amount according to the quantity of compressed air passing through the regenerator 3. The gas turbine exhaust gases, after leaving the regenerator 3, pass into the heat recovery boiler 10 and out through the stack 11.

As the demand for steam from the heat recovery boiler 10 is varied, the steam pressure in the steam outlet 13 varies. A pressure responsive device 16 generates a pressure signal through conduit 17 to the valve control mechanism 18 which, in turn, regulates the position of the by-pass control valve 15, in a manner similar to that described in the embodiment of Fig. 1.

In some applications it may be desirable to employ my device to produce superheated steam. Referring now to Fig. 3, there is illustrated a heat recovery apparatus somewhat as in the embodiment of Fig. 1, except that the heat recovery boiler and control system includes a steam superheater. However, it is to be understood that the heat recovery boiler and control system disclosed in Fig. 3 can also be applied to the embodiment illustrated in Fig. 2. Corresponding parts of Fig. 3 and Figs. 1 and 2 are identified by the same numbers.

The gas turbine exhaust gases from a regenerative cycle gas turbine follow the paths indicated by the arrows through the heat recovery apparatus and exhaust through the stack 11. A regenerator 3 is arranged in the path of at least a portion of the exhaust gases.

The heat recovery boiler consists of a main boiler 28 and steam superheater 29. Feed water enters the main boiler through the feed water inlet 12, passes through the main boiler 28, then into the steam superheater 29 and is withdrawn from the steam outlet 13.

A portion of the exhaust gases of the gas turbine pass first through the regenerator and then into the main boiler and out through the stack, as indicated by the arrows 30. Another portion of the gas turbine exhaust gases are by-passed around the regenerator directly into the main boiler 28 and out through the stack 11, as indicated by the arrows 31. The remaining portion of the exhaust gases pass directly into the steam superheater 29, then into the main boiler and out the stack 11, as indicated by the arrows 32.

As the demand for steam varies, the heat requirement in the heat recovery boiler varies. To regulate the quantity of heat available in the steam superheater 29, a temperature responsive device 33 acts through a conduit 34 on a steam temperature regulator 35. The steam temperature regulator controls the position of the temperature control valve 36 and regulates the quantity of the exhaust gases which are passed directly to the steam superheater. To regulate the quantity of heat available to the main boiler 28, a pressuer responsive device 16 located between the main boiler and the steam superheater transmits an impulse through conduit 17 to the steam pressure regulator or valve control mechanism 18. The steam pressure regulator 18 controls the position of the by-pass control valve 15 which, in turn, regulates the proportion of the gas turbine exhaust gases which are by-passed around the regenerator or air preheater and which pass directly into the main boiler 28. The heat available in the main boiler 28 then consists of the heat available in the exhaust gases passed through the steam superheater 29 as indicated by the arrows 32, the heat available in the exhaust gases passed through the regenerator 3 as indicated by the arrows 30, and the heat available in the exhaust gases which have been by-passed around the regenerator 3 as indicated by the arrows 31.

The operation of the pressure responsive device 16 and the steam pressure regulator or valve control mechanism 18 may be similar to that described in the embodiment of Fig. 1.

Likewise, the temperature responsive device 33 and the steam temperature regulator 35 may be similar in operation to that of the pressure responsive device 16 and the steam pressure regulator 18.

Referring now to Fig. 4 there is illustrated a heat recovery apparatus somewhat similar to the embodiment of Fig. 1 except that further means are provided for by-passing a variable portion of the exhaust gases around the heat recovery boiler. However, it is to be understood that the heat recovery apparatus and control system disclosed in Fig. 4 can also be applied to the embodiment illustrated in Fig. 2. Corresponding parts of Fig. 4 and Figs. 1, 2 and 3 are identified by the same numbers.

The gas turbine exhaust gases from a regenerative cycle gas turbine follow the paths indicated by the arrows through the heat recovery apparatus and exhaust through the stack 11. A regenerator 3 and boiler 10 are arranged in the path of at least a portion of the exhaust gases.

A portion of the exhaust gas of the gas turbine passes first through the regenerator 3 and then into the boiler 10 and out through the stack 11 as indicated by the arrows 37. Another portion of the gas turbine exhaust gases can be by-passed around the regenerator 3 directly into the boiler 10, and out through the stack 11, as indicated by the arrows 38. As an alternative control condition, a portion of the exhaust gases, after passing through the regenerator 3, can be by-passed around the boiler 10 as indicated by the arrows 39.

As the demand for steam changes, the steam pressure in the steam outlet conduit 13 varies, and the pressure responsive device shown generally at 16 and responsive to the steam pressure in the steam outlet conduit 13, reacts through the pilot valves 20 to send an impulse to the valve control mechanism shown generally at 18. The operation of the pressure responsive device 16 and the valve control mechanism 18 may be similar to that described in the embodiment of Fig. 1.

The quantity of exhaust gases by-passed around the regenerator 3 through the by-pass 14 is regulated by the by-pass control valve 15. The quantity of exhaust gases by-passed around the boiler 10 through the by-pass 40 is regulated by the by-pass control valve 41. Rods 42 and 43 control the respective positions of the by-pass control valves 15 and 41. Rods 42 and 43 can move freely in apertures in lever 44 except that their position is limited if the stops 45 and 46 come in contact with the lever 44. Rods 42 and 43 are biased downwardly by springs 47 and 48 respectively. This in turn biases by-pass control valves 15, 41 respectively to the closed position. As the steam pressure, in the steam outlet conduit 13 varies in response to the steam demand, the pressure responsive device 16 operates to move control piston 22 which in turn moves rod 49. An increase in the steam pressure will cause rod 49 to move upwardly rotating lever 44 counter-clockwise about fulcrum 50. Lever 44 comes in contact with stop 46 and raises rod 43 so as to open the by-pass control valve 41. As rod 42 moves freely in an aperture in lever 44, rod 42 is not moved and by-pass control valve 15 remains closed. A decrease in the pressure will operate through the pressure sensing device 16 and the control mechanism 18 to move rod 49 downwardly. Lever 44 then rotates clockwise. As lever 44 moves clockwise, rod 43 moves downwardly until the stop 46 is out of contact with lever 44. A further decrease in steam pressure will continue to move lever 44 clockwise about fulcrum 50, thereby engaging stop 45, raising rod 42 and opening by-pass control valve 15.

As will be seen from the above description, an excess of heat in the heat recovery boiler 10 will raise the steam pressure in the steam outlet conduit 13 and will actuate the control mechanism so as to close by-pass control valve 15 and open by-pass control valve 41. During these conditions all of the hot exhaust gases are passed in heat exchanging relation with the cold inlet air in the regenerator 3 and a portion of the exhaust gases are then by-passed through by-pass 40 around the heat recovery boiler 10 so as to decrease the amount of heat available in the heat recovery boiler 10. Upon an abnormal drop of the steam pressure in the steam outlet conduit 13, the control mechanism is actuated so as to open by-pass control valve 15 and close by-pass control valve 41. A portion of the hot exhaust gases are then by-passed around the regenerator 3 directly into heat recovery boiler 10 as indicated by the arrows 38 and thereby increase the heat available to the heat recovery boiler.

While I have described only certain preferred embodiments of my invention by way of illustration, many modifications will occur to those skilled in the art. For example, the pressure responsive device of Figs. 1 and 2 could be temperature responsive devices, and the heat recovery boilers illustrated in Figs. 1 and 2 could be arranged to deliver steam at a predetermined temperature. I, therefore, wish to have it understood that I intend in the appended claims to cover all such modifications as fall within the true spirit and scope of my invention.

What I claim as new and desire to secure by Letters Patent in the United States is:

1. In a gas turbine powerplant having a compressor, a combustion system, a turbine, and heat exchange means for recovering heat in the exhaust gases of the turbine, the combination of a first heat exchanger connected to transfer heat from the turbine exhaust gas to the compressed air discharged from the compressor, a second heat exchanger receiving exhaust gas discharged from the first heat exchanger, valve means adapted to apportion the available heat in the exhaust gas between said first and second exchangers, and condition-sensing means responsive to the demand for heated fluid from the second heat exchanger and connected to position said valve means to alter the heat available to said second heat exchanger.

2. A heat recovery system comprising a regenerator for utilizing at least a portion of the thermal energy in the exhaust gases of a regenerative cycle gas turbine, a heat recovery boiler for utilizing the remaining portion of the available heat in said exhaust gases, means connecting the regenerator and the heat recovery boiler for directing exhaust gases from the regenerator to the heat recovery boiler, means for apportioning the available heat in the exhaust gases between said regenerator and said heat recovery boiler, and means responsive to the heat requirements of the heat recovery boiler and operative to position said apportioning means for controlling the thermal energy supplied to said boiler.

3. A heat recovery system comprising a regenerator for utilizing at least a portion of the available heat units in the exhaust gases of a regenerative cycle gas turbine, a heat recovery boiler for utilizing the remaining portion of the available heat units in the exhaust gases of the gas turbine, means connecting the regenerator and the heat recovery boiler for directing exhaust gases from the generator to the heat recovery boiler, conduit means connected to by-pass a portion of the exhaust gases around the regenerator, control valve means for varying the proportion of gases by-passed around the regenerator, and servo means responsive to the heat requirements of the heat recovery boiler and connected to position said control valve means to apportion the available heat in the exhaust gas between the regenerator and the heat recovery boiler.

4. A heat recovery system as defined in claim 3 wherein said heat recovery boiler is a steam generator and the servo means is responsive to the pressure of the steam in said generator.

5. In a gas turbine powerplant system having a compressor, a combustion system, a turbine and heat exchanger means for recovering heat in the exhaust gases of the turbine, the combination of a first heat exchanger connected to transfer heat from the exhaust gas to the compressed air discharged from the compressor, a second heat exchanger receiving exhaust gas discharged from the first heat exchanger and utilizing the heat received from the exhaust gas in a system independent of the turbine powerplant system, by-pass conduit means connected to supply exhaust gas to said second heat exchanger without passing through the first heat exchanger, valve means adapted to apportion the flow of the gas through said first and second heat exchangers and condition-sensing means responsive to the demand for heated fluid from the second heat exchanger and connected to position said valve means to alter the heat available to said second heat exchanger.

6. A heat recovery system comprising a regenerator for utilizing at least a portion of the heat units in the exhaust gases of a regenerative cycle gas turbine to heat the intake air of said gas turbine, a heat recovery boiler for utilizing the remaining portion of the available heat units in the exhaust gases of the gas turbine, means connecting the regenerator and the heat recovery boiler for directing exhaust gases from the regenerator to the heat recovery boiler, means for apportioning the available heat in the exhaust gases between said regenerator and said heat recovery boiler comprising by-pass conduit means for by-passing a portion of the intake air around the regenerator and a by-pass control valve for regulating the proportion of intake air by-passed around the regenerator, and means responsive to the heat requirements of the heat recovery boiler and operative to position said by-pass control valve for controlling the thermal energy supplied to said boiler.

7. A heat recovery system in accordance with claim 6 wherein the heat recovery boiler is a steam generator and the by-pass control valve is responsive to the pressure of the steam in said generator.

8. In a gas turbine powerplant having a compressor, a combustion system, a turbine and heat exchanger means for recovering heat in the exhaust gases of the turbine, the combination of a first heat exchanger connected to transfer heat from the exhaust gas to the compressed air discharged from the compressor, a second heat exchanger receiving exhaust gases discharged from the first heat exchanger, by-pass conduit means connected to supply compressed air discharged from the compressor directly to the combustion system without passing through the first heat exchanger, valve means adapted to apportion the flow of the compressed air through said first heat exchanger and said by-pass conduit, and servo means responsive to the demand for heated fluid from the second heat exchanger and connected to position said valve means to alter the heat available to said second heat exchanger.

9. A heat recovery system comprising a regenerator for utilizing at least a portion of the heat units in the exhaust gases of a regenerative cycle gas turbine, a heat recovery steam boiler for utilizing the remaining portion of the available heat units in the exhaust gases of the gas turbine, said heat recovery boiler consisting of a main boiler and a steam superheater, a by-pass for by-passing a portion of the exhaust gases around the regenerator, a first by-pass control valve for regulating the proportion of exhaust gases by-passed around the regenerator to the main boiler of the heat recovery boiler, said first by-pass control valve being responsive to the pressure of the steam in the main boiler, and a second by-pass control valve for regulating the proportion of exhaust gases by-passed around the steam superheater, said second by-pass control valve being responsive to the temperature of the superheated steam leaving the said steam superheater.

10. The heat recovery system comprising a regenerator for utilizing at least a portion of the heat units in the exhaust gases of a regenerative cycle gas turbine, a heat recovery boiler for utilizing at least a portion of the remaining available heat units in the exhaust gases of the gas turbine, said regenerator and said heat recovery boiler being serially disposed in the path of the exhaust gas, first conduit means connected to by-pass a portion of the exhaust gases around the regenerator, second conduit means connected to by-pass a portion of the exhaust gases around the heat recovery boiler, first control valve means for varying the proportion of gases by-passed around the regenerator, second control valve means for varying the proportion of gases by-passed around the heat recovery boiler, and servo means responsive to the heat requirements of the heat recovery boiler and connected to position the by-pass control valves for apportioning the heat available in the exhaust gas between the regenerator, the heat recovery boiler, and the second conduit means.

11. A heat recovery system as defined in claim 10 wherein said heat recovery boiler is a steam generator and the servo means are responsive to the pressure of the steam in the steam generator.

12. In a gas turbine powerplant having a compressor, a combustion system, a gas turbine, and heat exchanger means for recovering heat in the exhaust gases of the turbine, the combination of a first heat exchanger connected to transfer heat from the exhaust gas to the compressed air discharged from the compressor, a second heat exchanger receiving exhaust gases discharged from the first heat exchanger, first by-pass conduit means connected to supply exhaust gas to the second heat exchanger without passing through the first heat exchanger, second by-pass conduit means connected to discharge exhaust gas from the first heat exchanger without passing through the second heat exchanger, first valve means adapted to apportion the flow of the gas through said first heat exchanger and said first by-pass conduit means, second valve means adapted to apportion the flow of the gas through the second heat exchanger and the second by-pass conduit means, and condition-sensing means responsive to the demand for heated fluid from the second heat exchanger and connected to position said by-pass control valve means to apportion the heat available in the exhaust gas between the first heat exchanger, the second heat exchanger, and the second by-pass conduit means.

13. In a gas turbine powerplant system having a compressor, a combustion system, a gas turbine, and heat exchanger means for recovering heat in the exhaust gases of the turbine, the combination of an exhaust gas duct; a regenerator disposed in said duct and partially filling the cross-section of said duct, the remaining cross-sectional area between said regenerator and the exhaust duct being utilized as a first by-pass conduit, said regenerator being connected to transfer heat from the exhaust gas to the compressed air discharged from the compressor; a heat recovery boiler disposed downstream of said regenerator, said boiler partially filling the cross-section of said duct, the remaining cross-sectional area between said boiler and the exhaust duct being utilized as a second by-pass conduit; a first control valve disposed in said first by-pass conduit for varying the proportion of gases by-passed around the regenerator; a second control valve disposed in said second by-pass conduit for varying the proportion of gases by-passed around the boiler; sensing means responsive to the demand upon the boiler and operatively connected to said first and second control valves for opening said first control valve when the demand on said boiler increases beyond a predetermined value and opening said second control valve when the demand on said boiler decreases beyond a predetermined value whereby the heat available in the exhaust gas is apportioned between the regenerator, the boiler and the second by-pass conduit.

References Cited in the file of this patent

UNITED STATES PATENTS

| | | |
|---|---|---|
| 1,288,557 | Gates | Dec. 24, 1918 |
| 1,978,837 | Forsling | Oct. 30, 1934 |
| 2,076,382 | Minton | Apr. 6, 1937 |
| 2,499,108 | Pfenninger | Feb. 28, 1950 |
| 2,554,228 | Walker et al. | May 22, 1951 |
| 2,713,245 | Weaving | July 19, 1955 |